US011231361B2

(12) United States Patent
Peter et al.

(10) Patent No.: US 11,231,361 B2
(45) Date of Patent: Jan. 25, 2022

(54) ARRANGEMENT AND METHOD FOR ANALYZING A FLUID (71) Applicants: Draegerwerk AG & Co. KGaA, Luebeck (DE); Fraunhofer-Gesellschaft zur Förderung d.a.F. e.V., Munich (DE)

(72) Inventors: Gerd Peter, Luebeck (DE); Margit Ferstl, Berlin (DE)

(73) Assignees: Drägerwerk AG & Co. KGaA, Lübeck (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 59 days.

(21) Appl. No.: 16/243,215

(22) Filed: Jan. 9, 2019

(65) Prior Publication Data
US 2019/0219497 A1 Jul. 18, 2019

(30) Foreign Application Priority Data

Jan. 12, 2018 (EP) .................... 18151391

(51) Int. Cl.
*G01N 21/25* (2006.01)
*G02B 27/10* (2006.01)
*G01N 21/27* (2006.01)
*G01N 21/3504* (2014.01)
*G01N 21/31* (2006.01)
*G01N 21/35* (2014.01)
*G02B 5/32* (2006.01)

(52) U.S. Cl.
CPC ......... *G01N 21/255* (2013.01); *G01N 21/274* (2013.01); *G01N 21/31* (2013.01); *G01N 21/35* (2013.01); *G01N 21/3504* (2013.01); *G02B 5/32* (2013.01); *G02B 27/1086* (2013.01); *G01N 2201/066* (2013.01); *G01N 2201/0633* (2013.01); *G01N 2201/0662* (2013.01)

(58) Field of Classification Search
CPC .... G01N 21/255; G01N 21/274; G01N 21/31; G01N 21/35; G01N 21/3504; G01N 2201/0633; G01N 2201/066; G01N 2201/0662; G02B 27/1086; G02B 5/32
See application file for complete search history.

(56) References Cited

U.S. PATENT DOCUMENTS 6,955,652 B1 10/2005 Baum et al.
7,339,668 B2 3/2008 Ebersole et al.
(Continued)

FOREIGN PATENT DOCUMENTS

DE 4133481 C2 8/1994
DE 10315864 B4 1/2006
(Continued)

*Primary Examiner* — Hina F Ayub
(74) *Attorney, Agent, or Firm* — 2SPL Patent Attorneys PartG mbB; Kieran O'Leary (57) ABSTRACT Embodiments create an arrangement and a method for analyzing a fluid. The arrangement (10) for analyzing a fluid comprises beam splitter and mixer optics (12) configured to spatially mix an optical signal and split the same into at least two spatial sub-beams and a flow cell (14) configured to spectrally influence at least the two spatial sub-beams (15*a*; 15*b*) by means of a probe of the fluid. The arrangement further comprises a measurement system (16) configured to measure the at least two spatially separated sub-beams (15*a*; 15*b*).

20 Claims, 7 Drawing Sheets (56) References Cited

U.S. PATENT DOCUMENTS

| | | | |
|---|---|---|---|
| 2002/0036266 A1 | 3/2002 | Dreyer | |
| 2005/0173635 A1 | 8/2005 | Smith | |
| 2009/0257054 A1* | 10/2009 | Hargis | G01J 3/10 356/246 |
| 2013/0075614 A1 | 3/2013 | Hartley | |
| 2015/0055915 A1* | 2/2015 | Logunov | G02B 6/04 385/31 |
| 2017/0059477 A1* | 3/2017 | Feitisch | G01N 21/274 |
| 2018/0245988 A1* | 8/2018 | Hong | G01N 21/4795 |
| 2019/0195778 A1* | 6/2019 | Lee | G02B 19/0023 |
| 2020/0096635 A1* | 3/2020 | Fischer | G02B 27/1086 |

FOREIGN PATENT DOCUMENTS

| | | |
|---|---|---|
| DE | 102005002106 B3 | 4/2006 |
| DE | 102012007561 A1 | 10/2013 |
| EP | 0591758 A1 | 4/1994 |
| EP | 1842040 B1 | 9/2016 |
| WO | 9602009 A1 | 1/1996 |
| WO | 20000070330 A1 | 11/2000 |
| WO | 2017001566 A1 | 1/2017 |

* cited by examiner

Intensity distribution of sub-beam 15a on the receiver level at the receiver unit 16a

ARRANGEMENT AND METHOD FOR ANALYZING A FLUID

Embodiments relate to an arrangement and a method for analyzing a fluid, more specifically, but not exclusively, to a concept for analyzing a fluid that provides for spatially mixing and splitting an optical signal influenced by the fluid.

From conventional art, measurement concepts are known which measure gases by means of spectroscopy. For example, reference DE10315864 B4 discloses a usual measurement arrangement. This arrangement serves to determine the concentration of multiple gas components in a breathing gas mixture. In this arrangement, the light of a (broad-banded) light source is concentrated by way of an optical element prior to passing through a flow cell/cuvette, is subsequently directed through a measurement cell and is then, following one beam splitting or several beam splittings, split to at least two receivers (a reference signal and at least one measurement signal). Here, a corresponding filter element is arranged in front of the receivers so that only the desired wavelength component of the light is captured by the corresponding detector.

A similar arrangement for the breathing gas analysis is known from WO00/70330 A1. In this arrangement, too, light of a broad-banded light source is concentrated by way of an optical element prior to passing through a flow cell/capillary, passes through the measurement cell and then is directly led onto an array (field arrangement) by receivers. Here, too, a corresponding filter element is arranged in front of the receivers in each case so that only a desired wavelength component of the light is captured by a corresponding sensing element.

Another measurement arrangement is known from reference EP 1 842 040 B1. In this measurement arrangement, the light of a (broad-banded or several wavelengths-containing) light source is focused onto a receiver by means of a diffractive optical element after light has been directed through a measurement object. Here, the diffractive element is executed in the form of a Fresnel lens. In this arrangement, several Fresnel lenses may also be arranged simultaneously in a two-dimensional array, wherein each lens of the arrangement is configured to focus a particular wavelength onto an intended detector. In this arrangement, no additional filter element is provided in front of each receiver element, as, in each case, each lens is configured to only focus radiation of a particular wavelength onto a particular receiver element in each case.

Direct wavelength-dependent beam splitting behind a flow cell/cuvette is also known from prior art, cf. document DE10 2005 002 106 B3. Here, the measuring light is split to various wavelengths as is usual in spectroscopy using a diffractive phase element. By simultaneously providing a refractive and focusing element, the measuring light is directed to individual sensing elements/receivers in an array.

Figure 7:
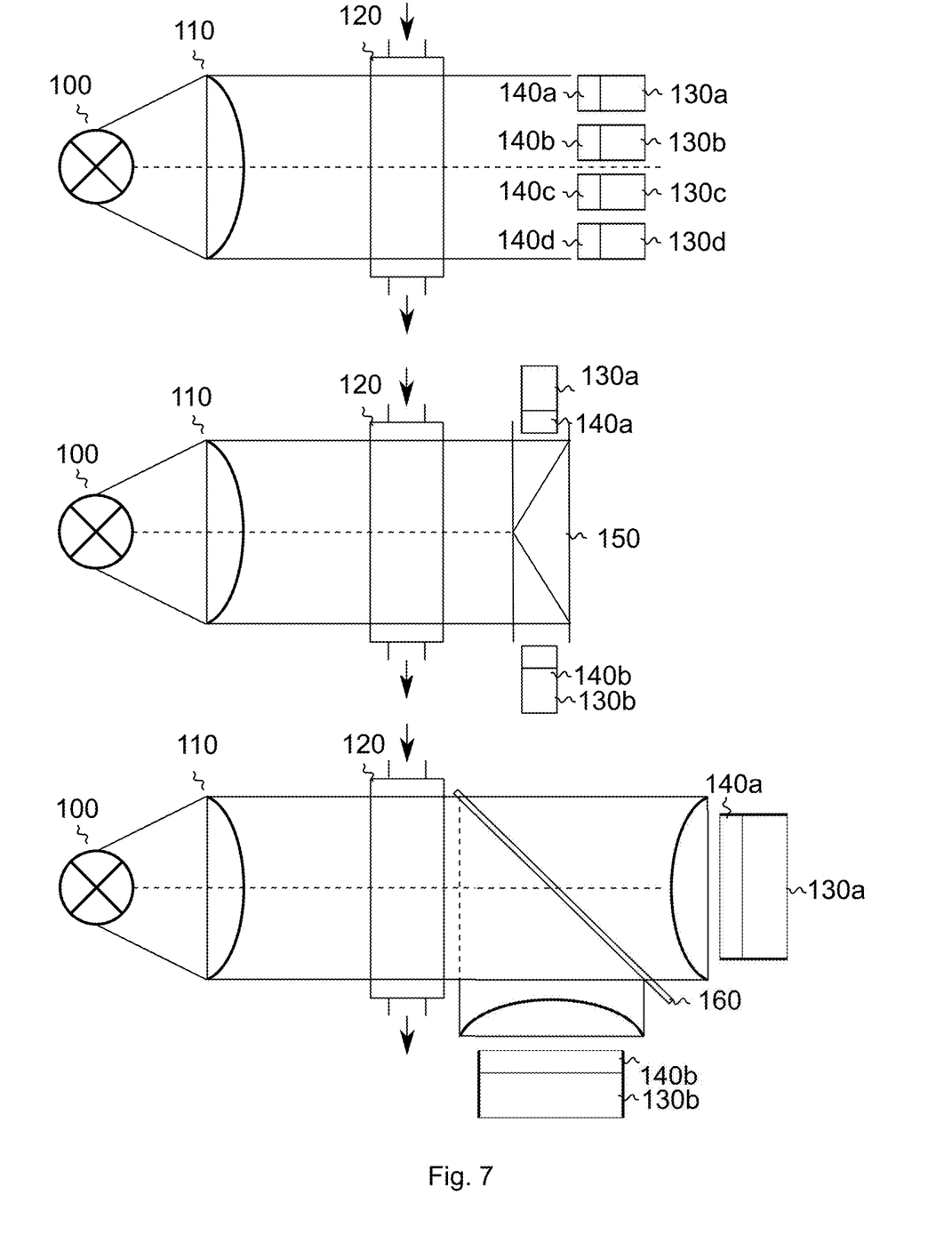
FIG. 7 shows conventional arrangements for analyzing a gas.

FIG. 7 shows various known measurement set-ups, each comprising a light source 100, optics 110 and a cuvette or flow cell 120. After passing through filter elements 140 a-d, the measuring light is then measured using receiver units 130a, 130b, 130c, 130d. On top, FIG. 7 shows a measurement set-up from prior art, e.g., as it is disclosed by document WO00/70330 A1. The light emitted by a light source 100 is collimated by means of suitable optics 110 and is directed through a flow cell/cuvette 120. Then, the measuring light falls on a receiver unit having several receiver elements 130a-d and upstream filter elements 140a-d. In the middle, FIG. 7 shows a set-up comprising a prism element 150 directing the measuring light onto the two light receivers 130a, b via the two filter elements 140a,b. At the bottom of FIG. 7, a beam splitter (e.g. a dichroic beam splitter) is used to split the measuring light to the two light receivers.

In many of these set-ups, it may be possible that, e.g., soilings and/or condensates possibly occurring on the walls and/or windows of the flow cell 120 are within the area of the flow cell 120 through which light is directed, while attenuating the intensity of a sub-beam of the measuring beam. By splitting the measuring beam into sub-beams, it is however possible in case of a suitable selection of wave-selective filter elements to correct a measurement error by attenuating the light due to these soilings. For this purpose, the measurement filter of a receiver unit is selected such that the corresponding sub-beam does not experience any spectral attenuation due to the measurement gas in the flow cell, but the receiver unit nevertheless captures the variation of the light intensity caused by the soiling effects. By normalizing the remaining measurement channels to this reference, gas concentrations incorrectly measured as too large may be corrected. Similar effects may be triggered by local fluctuations or differences in the concentration of the fluid in the flow cell.

However, if the disturbance only occurs locally, only those receiver elements are affected onto which the corresponding sub-beam is incident. In this case, a measurement error remains as measurement and reference beams do not change in a similar way due to the local shadings. Such a problem may also occur in the use of spatially selective beam splitters as shown in the central illustration of FIG. 7. For example, a mirrored prism element 150 may be used for splitting into a top and a bottom sub-beam. For example, the top sub-beam may be affected by a local disturbance and the bottom sub-beam may not be affected by the same, which may result in a local corruption of the measurement data. The same problem may also arise for the Fresnel lens element described in disclosure EP 1 842 040 A1 or the refractive lens array described in DE 10 2005 002 106 B4.

The measurement set-up shown at the bottom of FIG. 7 uses a spatially non-selective beam splitter 160 (e.g., a dichroic beam splitter). If a number of measurement sensors/receivers (e.g., for several absorption lines of one or several gases and of a reference wavelength) is required, another beam splitter element needs to be used for each additional receiver element in each case. This may result in additional losses and an expensive and not very compact set-up.

Therefore, there is a demand to provide an improved concept for analyzing a fluid. This demand is satisfied by embodiments of an arrangement and a method of any of the attached independent claims.

Embodiments are based on the findings that possibly existing soilings/build-ups (such as condensates) on the walls of a flow cell/capillary through which light is to be directed, or other disturbances such as scattering of drops or particles, or locally occurring flow fluctuations located within the corridor of the measuring light result in a local corruption of the measurement data, i.e., particular spatial components of the measurement light passing through the flow cell are affected by the disturbance but not others. Therefore, embodiments are based on the central idea to spatially mix the measuring light in order to uniformly mix and split the influence of such disturbances or soilings and to thus achieve some kind of spatial compensation or spatial averaging of the disturbing influences. In flow cells/cuvettes, such disturbing influences may originate from local fluctuations in pressure and/or concentration.

Embodiments are further based on the finding that, depending on the type of beam-splitting element, particular effects may occur here. Beam splitters (such as the above-mentioned two-dimensional arrangement of Fresnel lenses, any other simple lens array arrangement, but also mirrored prisms or a simple receiver array arrangement) directing different sub-components of an incident light beam onto different optical paths are directly affected by the spatially local above-mentioned disturbances in the measuring light which is directed through the probe. Individual sensing elements (each associated with an absorption line of a gas or a reference measurement) are affected by a local disturbance in the flow cell/capillary, but others not. In normal wavelength-selective beam splitters (e.g., dielectric/dichroic beam splitters) or simple partially reflecting mirror beam splitters, if several sensing elements are to be subjected to the same measuring light, beam splitter elements need to be arranged one behind the other, something that on the one hand results in increased losses in measuring light and on the other hand in a very complex and less compact set-up (particularly in case of measurement arrangements operating in the infrared range). In arrangements using beam splitters, beam splitter and detector may not be arranged behind one another in a stack-like manner, but at larger angles to the optical axis. This may result in high efforts in the set-up and connection technology.

Embodiments create an arrangement or a way of measuring independent of local soilings/disturbances in the beam corridor, which prevents measurements errors even in case of local fluctuations in the gas/vapor mixture in the flow cell/cuvette, which overall accounts for few losses and which may have a very compact design. Embodiments create an arrangement for analyzing a fluid. The arrangement comprises beam splitter and mixer optics configured to spatially mix an optical signal and split the same into at least two spatial sub-beams. The arrangement further comprises a flow cell configured to spectrally influence at least the two spatial sub-beams by means of a probe of the fluid. Furthermore, the arrangement comprises a measurement system configured to measure the at least two spatially separated sub-beams.

Embodiments further create a method for analyzing a fluid. The method comprises spatially mixing and splitting an optical signal into at least two spatial sub-beams. The method comprises influencing the at least two spatial sub-beams with a probe of the fluid and measuring the at least two spatial sub-beams. By spatially mixing, disturbing influences (ideally in a uniform manner) may be spatially distributed and have the same impact on the sub-beams. It can thus be achieved that the disturbance impacts the sub-beams in a uniform relative manner.

In some embodiments, the beam splitter and mixer optics may be arranged in direction of propagation of the optical signal in front of the flow cell in order to direct the at least two spatial sub-beams through the probe of the fluid. In other embodiments, the beam splitter and mixer optics may be arranged in direction of propagation of the optical signal behind the flow cell in order to direct the optical signal through the probe of the fluid. Thus, embodiments may offer flexibility in terms of the arrangement. For example, an optical signal may be directed through the probe to be examined and the optical signal thus influenced by the probe may then be mixed and split. In some embodiments, it may initially be mixed and split, and then sub-beams are directed through the probe in order to subsequently influence the sub-beams accordingly.

In some other embodiments, the arrangement may be configured to analyze a gaseous or vaporous fluid. For example, embodiments may be used to analyze breathing gas. Further, the arrangement may comprise at least one thermal light source configured to generate the optical signal for directing the same through the flow cell and may thus be provided in a compact manner. In embodiments, the measurement system may comprise a light receiving unit having at least two light receivers each comprising an upstream and associated filter or filter element so that, at least in some embodiments, electric measurement signals or measurement values may directly be emitted. The beam splitter and mixer optics may comprise a diffractive optical element, particularly a computer-generated hologram (CGH). Thus, at least in some embodiments, the mixing and splitting may be realized by a single component. The diffractive optical element/CGH may be configured to perform a beam splitting of 1 to n into n sub-beams for n measurement fields, wherein n is a non-negative integer greater than 1. In this respect, more than two sub-beams may also be formed and thus make more measurements possible, e.g., examine several spectral portions or absorptions. The diffractive optical element may be configured to, as a 1 to n (e.g. 4) beam splitter/mixer, perform a split into at least 4 quadrants.

Some embodiments use measurement results normalized to a reference beam or a reference measurement (this generally happens by one of the sub-beams being used as a reference beam for the normalization). The beam splitter and mixer optics may hereby be configured to generate a central beam usable as a reference for other beams. The arrangement of the receiving elements may further be configured in a reference-adjusted manner such as to use the central beam (i.e. the non-diffractively continuous beam which usually occurs more or less strongly) as a reference for the other beams. By using the central beam as a reference beam, another sub-beam is available as a measurement beam.

The beam splitter and mixer optics may be configured to be a DOE or a computer-generated hologram (CGH). The computer-generated hologram may be configured to generate at least two sub-beams having different or also having equal intensities and any spatial 2D arrangement. The beam splitter and mixer optics (DOE/CGH) may comprise at least one collimating or focusing element. The collimating or focusing element may be realized as a refractive element or also a diffractive element (Fresnel zone lens). The collimating or focusing element may be coupled to the diffractive beam splitter/mixer element. In this respect, embodiments may provide an arrangement comprising optical components required for the measurement. Thus, embodiments may enable a compact and inexpensive set-up of the arrangement.

At least some embodiments comprise a thermal beam emitter as a light source, wherein the light source further comprises collimating optics. The collimating optics may comprise a reflecting concentrator arranged around the light source. Further, the measurement system may comprise focusing or collimating optics in front of a receiver unit. Both the collimating optics and the focusing optics may also be configured as a refractive lens or a diffractive lens (e.g., Fresnel zone lens). The refractive and the diffractive lens may comprise silicon or an IR-transparent polymer material. However, the concentration of the sub-beams onto the receiving cell may also be performed by means of a concentrator (e.g., paraboloidally shaped, reflectively coated tube). The measurement system may comprise one or several wavelength-selective filter elements. In each case, one filter element may be arranged in front of a receiver element of a light receiver unit. In some embodiments, filter and receiver elements may be arranged in two or more wavelength groups spatially separated from one another. Embodiments may thus provide an arrangement for an analysis of a fluid in a compact and inexpensive manner.

In the following, further advantageous implementations are explained in more detail using the embodiments illustrated in the Figures to which, however, embodiments are not restricted, and in which.

Various embodiments will now be described in more detail with reference to the accompanying drawings in which some example embodiments are illustrated.

Like reference signs refer to like or similar components throughout the following description of the included figures, which merely show some exemplary embodiments. Furthermore, summarizing reference signs will be used for components and objects which occur several times in one embodiment or in one Figure but are described jointly with regard to one or several features. Components or objects described with like or summarizing reference signs may be implemented alike or also differently, if applicable, with respect to one, several or all the features, e.g. their dimensioning, unless explicitly or implicitly stated otherwise in the description. Optional components are illustrated in the Figures by dashed lines or arrows.

Even though embodiments may be modified and changed in various ways, embodiments are illustrated as examples in the Figures and are described in detail herein. However, it is made clear that it is not intended to restrict embodiments to the respectively disclosed forms but rather that embodiments are to cover all functional and/or structural modifications, equivalents and alternatives that lie within the scope of the invention. Like reference signs designate like or similar elements throughout the entire description of figures.

It is to be noted that an element which is referred to a being "connected" or "coupled" to another element, may be directly connected or coupled to the other element or that intervening elements may be present. If, on the other hand, an element is referred to as being "directly connected" or "directly coupled" to another element, no intervening elements are present. Other terms used to describe the relationship between elements should be interpreted likewise. (e.g. "between" versus "directly between", "adjacent" versus "directly adjacent", etc.).

The terminology used herein is for the purpose of describing particular embodiments only and should not limit the embodiments. As used herein, the singular form such as "a," "an" and "the" also include the plural forms, as long as the context does not indicate otherwise. It will be further understood that the terms e.g. "contain", "containing", "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless defined otherwise, any and all terms (including technical and scientific terms) used herein have the same meaning as commonly understood by one of ordinary skill in the art to which the disclosed embodiments belong. Furthermore, it is made clear that terms, e.g., those defined in generally used dictionaries are to be interpreted as having the meaning consistent with the meaning in the context of relevant technology and are not to be interpreted in an idealized or overly formal sense, unless expressly otherwise defined herein.

Figure 1:
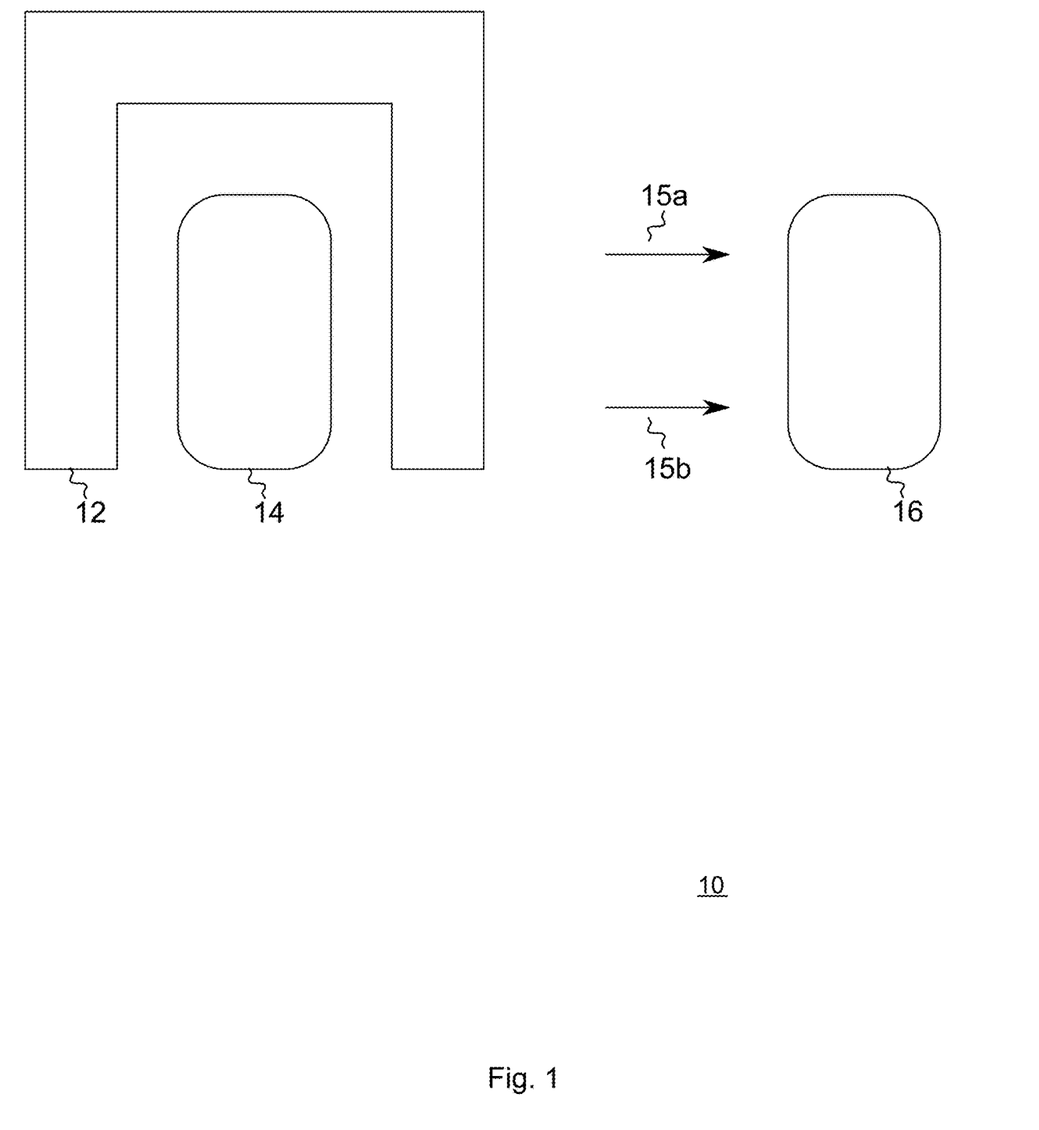
FIG. 1 illustrates a block diagram of an embodiment of an arrangement for analyzing a fluid.

FIG. 1 shows a block diagram of an arrangement 10 for analyzing a fluid. Hereinafter, a fluid shall be understood as a liquid, gaseous or vaporous substance. Embodiments are hereinafter described for gaseous or vaporous probes, wherein the same arrangements and aspects may also apply to liquid probes. In other words, the arrangement 10 may be configured to analyze a gaseous or vaporous fluid in embodiments. Here, the analysis applies to measuring an absorption characteristic in one or several wavelength ranges in order to measure the composition of the fluid or any molecules/elements and/or molecule or element concentrations available in the fluid. For this purpose, light is sent through a probe, where it is spectrally influenced by the probe. Then, a spectral analysis performed on the light influenced by the probe may provide information on the composition of the probe/the fluid.

Against this background, it should be highlighted that spectral influencing herein is understood as influencing the spectrum generally, which influencing may be broad-banded or also narrow-banded. Typical influencing is the absorption or attenuation of the incident light for particular spectral lines by elements/molecules or components of the probe. As explained in more details below, the sub-beams initially equally spectrally influenced may be filtered differently, e.g., in order to examine an intensity for a specific spectral line (which, as known, would be influenced by a component of the probe) or also to create a reference, e.g., for an adjacent spectral line which would not be influenced by the component. A ratio of the intensities established in this way could then provide information on the presence or also a concentration of the component in the probe. Here, the above-mentioned soiling effects are mostly broad-banded, i.e., they influence the spectrum in a substantially uniform manner.

The arrangement 10 comprises beam splitter and mixer optics 12 configured to spatially mix an optical signal and split the same into at least two spatial sub-beams 15a, 15b. For example, the optical beam splitter and mixer optics 12 may operate in transmission, something that allows for a compact set-up. Furthermore, the arrangement 10 comprises a flow cell 14 configured to spectrally influence at least the two spatial sub-beams 15a, 15b by means of a probe of the fluid. Here, the flow cell 14 may, for example, correspond to a cuvette or a probe container. As further shown in FIG. 1, the arrangement 10 further comprises a measurement system 16 configured to measure the at least two spatially separated sub-beams 15a, 15b. In embodiments, there are various possibilities as to how the beam splitter and mixer optics 12 may be arranged in relation to the flow cell 14. This is indicated by the u-shaped form of the beam splitter and mixer optics 12.

For example, the beam splitter and mixer optics 12 may be arranged in direction of propagation of the optical signal (from left to right in the Figures) in front of the flow cell 14 in order to direct the two spatial sub-beams 15a, 15b through the probe of the fluid. Therefore, in such an embodiment, the at least two sub-beams 15a, 15b are used to be directed through such probe. In another embodiment, the beam splitter and mixer optics 12 may also be arranged in direction of propagation of the optical signal behind the flow cell 14 in order to direct the optical signal through the probe of the fluid, before such signal is split into the at least two sub-beams 15a, 15b. A corresponding combination is also possible. In some embodiments, the beam splitter and mixer optics 12 may also be integrated in the flow cell 14; for example, this may be realized by integration into a window or a sidewall of the flow cell 14.

Figure 2:
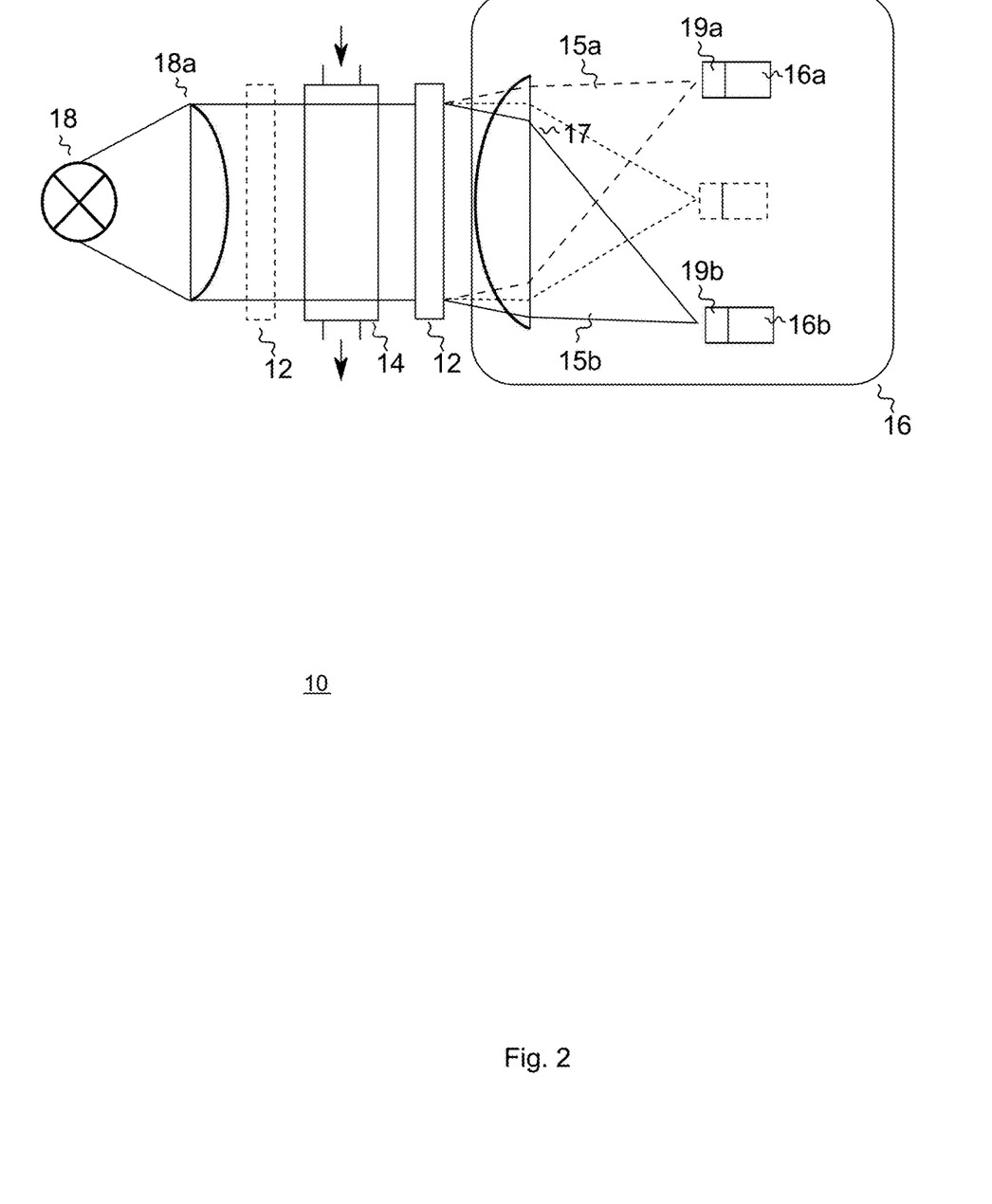
FIG. 2 shows an arrangement for analyzing a fluid in an embodiment.

FIG. 2 shows an arrangement 10 for analyzing a fluid in another embodiment. FIG. 2 illustrates an arrangement 10 for analyzing a fluid, wherein a light source 18 is located on the left-hand side of such arrangement. In this embodiment, the arrangement 10 comprises the at least one light source 18 to generate the optical signal for directing the same through the flow cell 14. Therefore, the beam path in FIG. 2 is again from left to right. As further shown in FIG. 2, collimating optics 18a is downstream to the light source 18.

In embodiments, the light source 18 may, for example, comprise a thermal beam emitter which at least approximately provides radiation having a continuous spectrum. Depending on the temperature, the radiation maximum may shift accordingly in the radiated spectrum. In embodiments, various implementations of the collimating optics 18a may further be made. Various lenses are possible, wherein a plano-convex lens is shown in FIG. 2 which at least approximately generates parallel light for being directed through the flow cell 14 when combined with the light source 18. In other embodiments, the collimating optics 18a may, for example, also comprise a reflecting concentrator arranged around the light source 18 (e.g., Winston cone). In general, embodiments may comprise any optical elements for beam generation, direction and processing.

Further, FIG. 2 shows a flow cell 14 through which the light generated by the light source 18 using collimating optics 18a is directed. In the embodiment shown, the beam splitter and mixer optics 12 of the flow cell 14 is downstream and generates at least two spatial sub-beams 15a, 15b subsequently measured by the measurement system 16. As schematically indicated by dashed lines in FIG. 2, the beam splitter and mixer optics 12 may also be arranged in front of the flow cell 14 so that the at least two scab-beams 15a, 15b are directed through the entire flow cell.

FIG. 2 shows a schematic illustration, wherein the diffraction angles of the sub-beams are illustrated "in an exaggerated manner" (i.e., larger than is usually normal). Even if the beam splitter and mixer optics 12 of the flow cell 14 is upstream, it may be ensured that the sub-beams capture possible soilings on those windows located at the edge of the flow cell 14 ("cuvette edge"). The focusing or collimating optics 17, e.g., a lens, is not necessarily required.

As the sub-beams of the beam splitter and/or mixer optics only develop spatially separated in the far field, the at least two sub-beams 15a, 15b will be directed through (almost) the entire probe in the flow cell 14 in this arrangement as well, so that the sub-beams 15a, 15b are influenced approximately completely by the face through which light is directed. Furthermore, embodiments are possible which comprise beam splitter and mixer optics 12 in front of and behind the flow cell, e.g., to further split sub-beams 15a, 15b. Furthermore, the beam splitter and mixer optics 12 may also, either entirely or partially, be integrated in the flow cell.

FIG. 2 further illustrates the measurement system 16 which may comprise focusing or collimating optics 17 in front of the at least two receiver units 16a, 16b. Various implementations are possible for the focusing or collimating optics 17. Here, FIG. 2 shows an implementation comprising a plano-convex lens focusing the at least two parallel sub-beams 15a, 15b) onto the receiver units. Basically, any optical components may be used here. Both the collimating optics 18a and the focusing optics 17, 12b may also be configured as a refractive lens or a diffractive lens. The refractive and the diffractive lens may comprise silicon or an IR-transparent polymer material.

In the embodiment of FIG. 2, the measurement system 16 comprises a light receiving unit having at least two light receivers 16a, 16b which may, for example, be implemented as photo detectors (e.g., photo diodes, photo transistors). The measurement system 16 may generally comprise one or several wavelength-selective filter elements 19a, 19b which may, for example, be implemented as color filters. Here, too, any optical filters may be used as filter elements, e.g., Fabry Perot filters, optical resonators, polarization filters, etc.

In each case, one filter element 19a, 19b may be arranged in front of a receiver element 16a, 16b of a light receiver unit. However, other implementations are also possible, e.g. comprising several filter elements in front of a light receiver or also a filter element in front of several receiver elements, e.g., in case of multi-stage filter concepts. In some other embodiments, the filter and receiver elements 19a, 19b, 16a, 16b may also be arranged in two or more wavelength groups spatially separated from one another. Therefore, the measurement system 16 provides measurement signals originating from the filtered optical signals of the sub-beams 15a, 15b.

In embodiments, the beam splitter and mixer optics 12 ensure that light can be directed through the probe in the flow cell 14 planarly (extensively) and so the signals in the at least two sub-beams 15a, 15b are at least approximately influenced by the entire face of flow cell 14 through which light is directed. Possible disturbing influences, e.g., originating from soilings, therefore have (almost or approximately) the same impact on the sub-beams 15a, 15b. Embodiments are based on the finding that the uniform splitting (mixing) of all local portions of a measuring light beam, which penetrated a probe, to all receiver elements of a relevant array results in locally occurring disturbances in the area of the flow cell/capillary/probe, through which light is directed temporally variably and only by a part of the measuring light beam, possibly being uniformly distributed to all sensor elements, so that possible fluctuations in flow, soilings in the beam corridor etc. result in all reference and measurement channels being affected in an equal time-independent manner and that this error may be corrected by the subsequent normalization.

This concept may generally be applied and may basically be implemented using any appropriate optics. In this context, the precise execution obviously depends on various factors. In particular, these are the type of light source used (which wavelengths are available, which ones are used), the beam profile of the (beam of) light which is to be directed through the flow cell/capillary 14, the form and type of flow cell/cuvette 14 and, of course, the arrangement of the receivers in the receiver array (measurement system 16).

In embodiments, the arrangement 10 may also be used as an optical sensor for analyzing gas/vapor. In some embodiments, the sensor preferably operates in the near to far infrared range, particularly in case of a wavelength between 3 μm and 12 μm, but may be configured for any wavelength range. It is provided and/or usable for the analysis of content gases/vapors and/or composition of a gas and/or vapor in medical technology for analyzing breathing gas, in combustion technology for analyzing exhaust gas (e.g., energy technology but also automotive engineering), in environmental technology, in plant monitoring or generally for analyzing gases and vapors.

In other embodiments, variants of the arrangement 10 and/or the sensor for the fluid/liquid/gas/vapor analysis are possible. They usually comprise a light source 18, a flow cell/capillary 14 for the flow of the fluid/gas/vapor mixture to be analyzed and a light receiver unit (detector) 16. The light flux from the light source 18 through the flow cell/capillary 14 to the light receiver unit 16 is usually controlled by optical elements such as lenses, collimators etc. A fluid/gas/vapor analysis may then be performed (via the wavelength-selective absorption of the fluids/gases/vapors) via suitable wavelength-selective evaluation and calibration methods (which are not to be further specified here as they are known to the person skilled in the art of sensor technology).

A further aspect of embodiments relates to a compact set-up of appropriate optics, i.e., the beam splitter and mixer optics 12, which may be manufactured in a particularly inexpensive way. For example, a special diffractive optical beam splitter and mixer element may be designed that provides both of the required functions in the detector level. Thus, the beam splitter and mixer optics 12 may comprise a diffractive optical element/computer-generated hologram 12a. For example, the beam splitter and mixer optics 12 may comprise a computer-generated hologram as detailed further below. A beam splitter DOE and/or a COLT may be composed of a 2D matrix of many unit cells ("periodically") lined up in x/y direction.

The measurement set-up in embodiments of FIG. 2 may offer advantages in terms of various disturbing influences. For example, behind the flow cell 14, a diffractive optical element is located which may also be realized as a computer-generated hologram which mixes the light coming from the light source 18 and splits the same into at least two individual sub-beams 15a, 15b. This splitting is here done in a way so that, originating from each sub-beam 15a, 15b, a portion is directed in the direction of each receiver element (in FIG. 2 only two such sensing elements are shown; however, the principle may also be expanded to almost any number). For example, the diffractive optical element/CGH may be configured to perform a beam splitting of 1 n into n sub-beams for n measurement fields, wherein n is a non-negative integer greater than 1.

The light split and mixed by the diffractive optical element/the computer-generated hologram may then be focused/directed/concentrated onto the receiver elements 16a, 16b, which may also be realized as receiver unit, by another optics 17 (e.g., a lens, focusing optics or concentrating optics), and falls through the filters 19a, 19b onto the receivers/detectors 16b, 16b. As the measuring light is not spatially selected in this arrangement 10, disturbances locally occurring at the flow cell/cuvette 14 have not impact on the measurement result.

Embodiments for beam splitter and mixer optics 12 may be executed as DOE (diffractive optical element)/CGH (computer-generated hologram). Here, such a beam splitter mixer element 12 comprises an array (field arrangement) of micro-structured unit cells 12c periodically arranged in two spatial directions. In this respect, each unit cell comprises the same optical functions, e.g. a splitting into at least 2 sub-beams 15a, 15b (FIG. 2), wherein e.g. each sub-beam may have approximately the same, but also a defined different partial intensity, and then, as a total, split an incident light beam accordingly.

Figure 3:
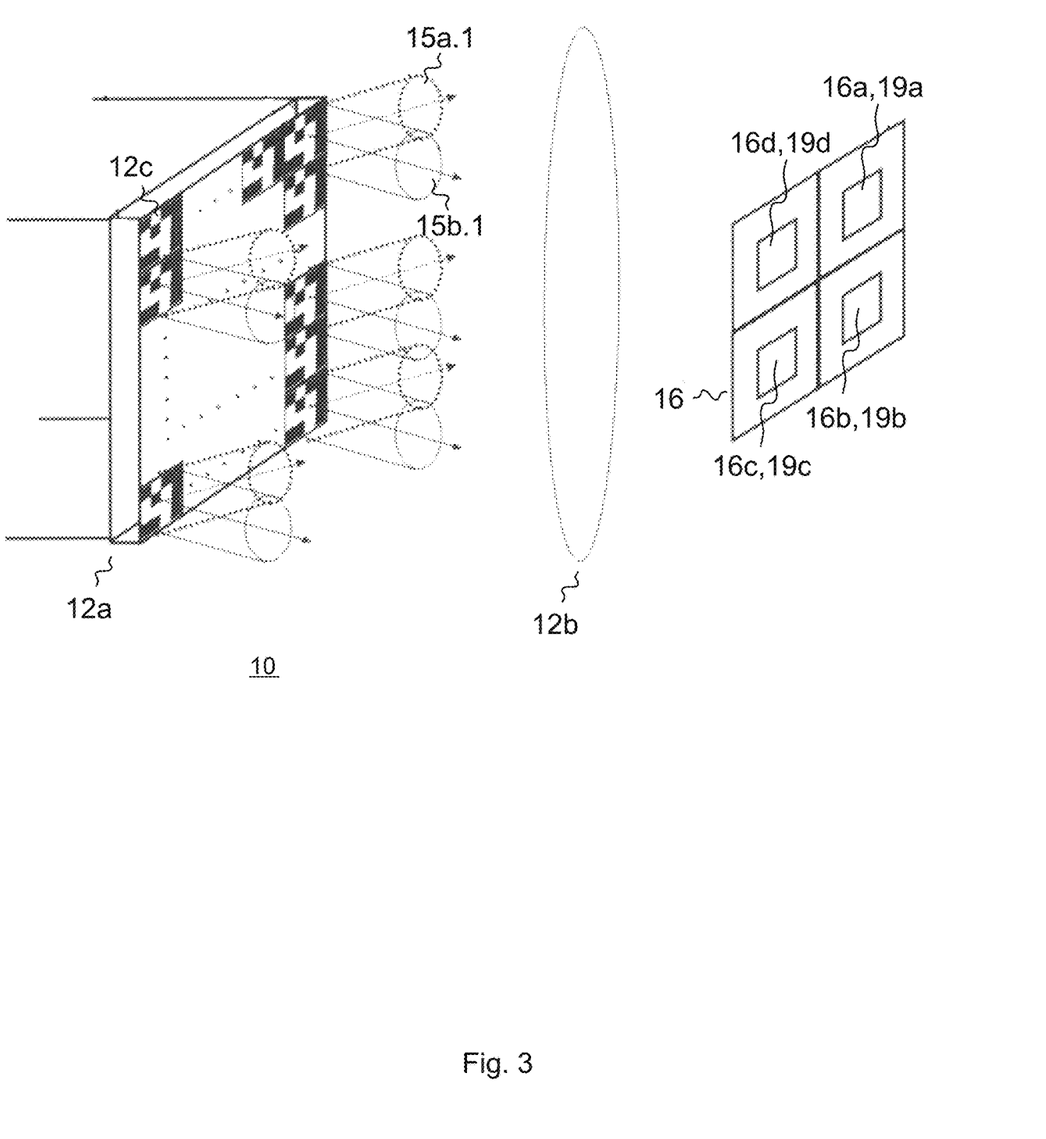
FIG. 3 shows a computer-generated diffractive optical element (CGH) in an embodiment.

FIG. 3 shows a diffractive optical element 12a in a first embodiment of a 1 to 4 beam splitter/mixer element. The DOE 12a is composed of unit cells 12c of a CGH, which are lined up periodically in both spatial directions in a planar structure (field arrangement, array) and/or in matrix form. As further shown in FIG. 3, each unit cell 12c splits the incident light beam by diffraction onto the unit sub-beams 15a.1, 15b.1 (for reasons of clarity, the other two unit sub-beams are not illustrated). The unit sub-beams 15a.1, 15b.1 then form the sub-beams 15a, 15b shown in previous FIG. 2. In each case, FIG. 3 shows two sub-beams 15a.1, 15b.1 per unit cell 12c having different line types. The diffractive optical element 12a of FIG. 3 is configured to, as a 1 to 4 beam splitter, perform a split into 4 quadrants of a receiver array using the receiver elements 16a, 16b, 16c, 16d and upstream filter elements 19a, 19b, 19c, 19d which are shown on the right-hand side of FIG. 3. For reasons of clarity and easy illustration, only the back two sub-beams 15a and 15b are depicted in FIG. 3; the front two sub-beams 15c and 15d are not depicted here. The beam corridor through the optics 12b and the focusing onto the 4-channel detector 16 are not illustrated.

In FIG. 3, 12c refers to a unit cell. By periodic repetition of at least 2×2 of these unit cells (2 in x direction, 2 in y direction), a calculated function, e.g. beam splitting of e.g. 2×2 sub-beams, may be observed in the far field. In embodiments, a "number" of unit cells (in x/y direction) is generally used each of which carries the "function" of the "corresponding beam splitting". The constructive superposition of the many sub-beams of a number of unit cells results in a "clear" implementation of e.g. 4=2 (in x direction)×2 (y direction) sub-beams in the far field. The lens 12b in FIG. 3 is not necessarily required.

The transmissive DOE/CGH, which is for example calculated for a medium wavelength in the 8.4 μm infrared range (as a 2-step phase element), splits an incident beam, which is almost collimated by means of a Winston cone (collimating optics), of a (broad-banded) light source 18 into four light lobes (15a, 15b etc.) each of which impacts on a corresponding measurement field of the receiver unit 16 in the far field in a plane (here a four-channel detector having the four receiver elements 16a-d and the four corresponding wavelength-selective filters (19a-19d) (FIG. 3). Here, the general characteristic of a DOE, i.e., that the desired optical function (here the splitting of the measurement beam into 4 sub-beams) only occurs in the far field, results in the light which is transmitted through the DOE 12a also being mixed, whereby the averaging effect towards disturbing influences occurs.

A specific embodiment for determining the concentration of halogenated hydrocarbons, e.g., volatile anesthetic agents (isoflurane, sevoflurane, desflurane), uses a DOE/CGH as a beam splitter and mixer optics for splitting the (broad-banded) light into 4 sub-beams having approximately the same intensity onto the 4 "quadrants" of a 4-channel detector. A thermal beam emitter, having a Winston cone reflector for beam forming, serves as a source for the wavelength range between 8 μm and 11 μm. The 1 to 4 beam splitter/mixer (CGH) was calculated and implemented as a binary transmissive phase element for the 8.4 μm medium wave length. After radiating through the measurement cell (cuvette), the 4 sub-beams generated by the DOE/CGH are incident at a distance of 10 mm on the 4-channel detector implemented with the 3 measurement filters (19a to 19c) at the wavelengths of 8.2 μm, 8.4 μm and 8.6 μm and the reference filter 19d (for the wavelength 10.5 μm).

Figure 4:
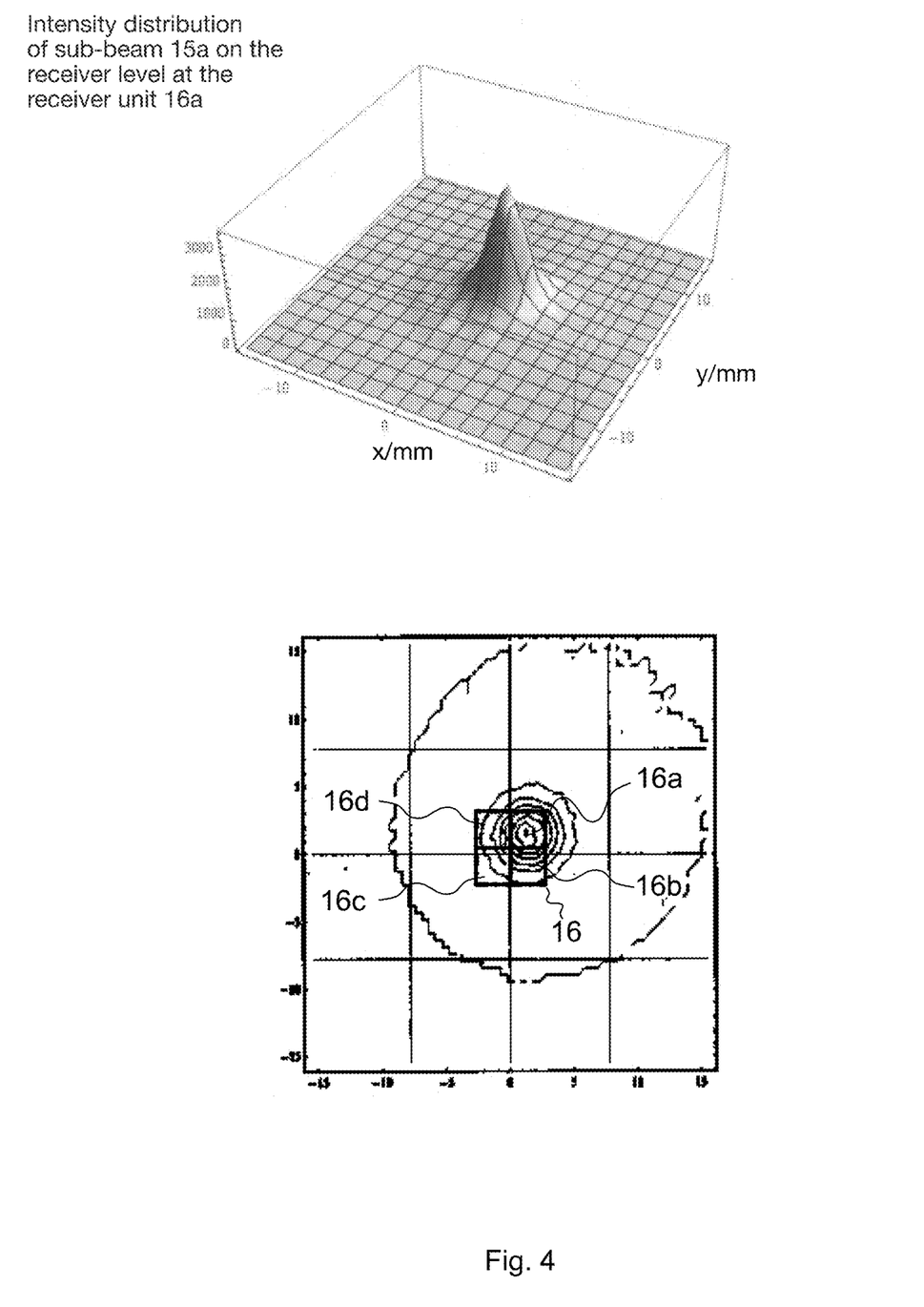
FIG. 4 depicts simulated intensity distributions in an embodiment.

Here, the spectral position of the measurement channels was selected such that a largest possible gas-type-specific attenuation of the radiation occurs there, while the measuring gas absorbs no radiation or only radiation at a negligible scale at the spectral position of the reference channel. Thus, the measuring gas has no impact on the reference channel and serves to capture the intensity of the incident radiation. FIG. 4 shows, as an example for the four sub-beams, the simulated intensity distribution of the sub-beam 15a which is received for the beam, which is almost collimated by a Winston cone, of a thermal beam emitter after passing through the computer-generated 1 to 4 beam splitter and mixer element on the receiver level at a distance of 10 mm in the detector field (16a). On the top of FIG. 4, the simulated intensity distribution for the 8.2 µm wavelength is illustrated in a three-dimensional representation (3D plot), and as a contour plot at the bottom. The calculation/simulation of the intensity distribution of the sub-beams in the detector level was performed without using additional focusing optics.

Both representations show that the intensity of the respective sub-beam may be diffracted by means of the beam splitter and mixer element 12 onto one quadrant of the measurement system 16 each. Variants of the functions of the DOE are also possible. Instead of uniformly splitting into four sub-beams, such splitting may also be done into any other number of sub-beams with different intensities, e.g., by using a multi-stage phase DOE. It is also possible to provide e.g. a reference sub-beam possibly comprising a different intensity than the surrounding sub-beams. Furthermore, the beam splitter and mixer optics 12 may be configured to generate a central beam usable as a reference for other beams. The computer-generated hologram and/or beam splitter and mixer optics 12 may be configured to generate the at least two spatial sub-beams 15a, 15b with different intensities and any spatial arrangement.

A reference sub-beam may, for example, be arranged centrally (to take advantage of the central diffraction arrangement) as indicated in FIG. 2 by the dashed beam path and the centrally arranged, dashed receiver unit. Besides, it is possible to provide each sub-beam or also specific groups of sub-beams with different intensities. The free choice of splitting ratio of the incident radiation onto the sub-beams is particularly beneficial where measurement and reference channels impose different requirements on a signal-to-noise ratio S/N ratio and temporal measuring dynamics. For example, it may apply to the reference channel that only temporally slow signal changes need to usually be captured there and that therefore a longer notification period is available than for the remaining measurement channels which also need to capture quick changes in concentration. Thus, the reference channel requires a low splitting ratio in favor of a corresponding higher weight for the remaining measurement channels at a good or even optimum S/N ratio.

Furthermore, the spectral corridor of the emission of the beam emitter used and different bandwidths of the optical filters used may be compensated for the measurement and reference channels. In this way, in embodiments it is possible with a DOE/CGH to favorably or even optimally split the incident radiation depending on the measurement set-up and requirement.

The splitting as such does also not need to be done in the form of a quadrant, i.e., any 2-dimensional arrangements can be realized. In embodiments, commercially available software tools may be used to establish/calculate a corresponding DOE design/DOE pattern. For example, a corresponding DOE/CGH may be manufactured using micro-structuring technologies (e.g., lithography and a deep structuring by means of etching and corresponding etching masks) known to the person skilled in the art of semiconductor industry.

The materials which may be used for the DOE/CGH primarily depend on the measurement wavelengths, i.e., the material has to have a sufficiently high transmissivity. For example, silicon is suitable for the infra-red light between 3 µm and 13 µm as it has a high transmission in this wavelength range and may further be structured in large numbers in a very inexpensive manner. Beam splitter applications, wherein the measurement channels are split to several different wavelength ranges, e.g., as is typically in the anesthetic breathing gas analysis, —$CO_2$ and $N_2O$ measurement channels in a first wavelength range $\Delta\lambda_1$ between 3 µm and 5 µm and (several) measurement channels for the vaporous volatile anesthetic agents (e.g., isoflurane, sevoflurane, desflurane) in a second wavelength range $\Delta\lambda_2$ between 8 µm and 10 µm—, particularly benefit from the characteristics of the DOE/CHG: As the diffraction angles φ for the sub-beams depend on the wavelength λ according to sin φ~λ, the locations of maximum intensity for a first group of sub-beams from the wavelength range $\Delta\lambda_1$ occur spatially separated from those of a second group of sub-beams from the wavelength range $\Delta\lambda_2$ having a similar distribution at correspondingly larger diffraction angles.

Figure 5:
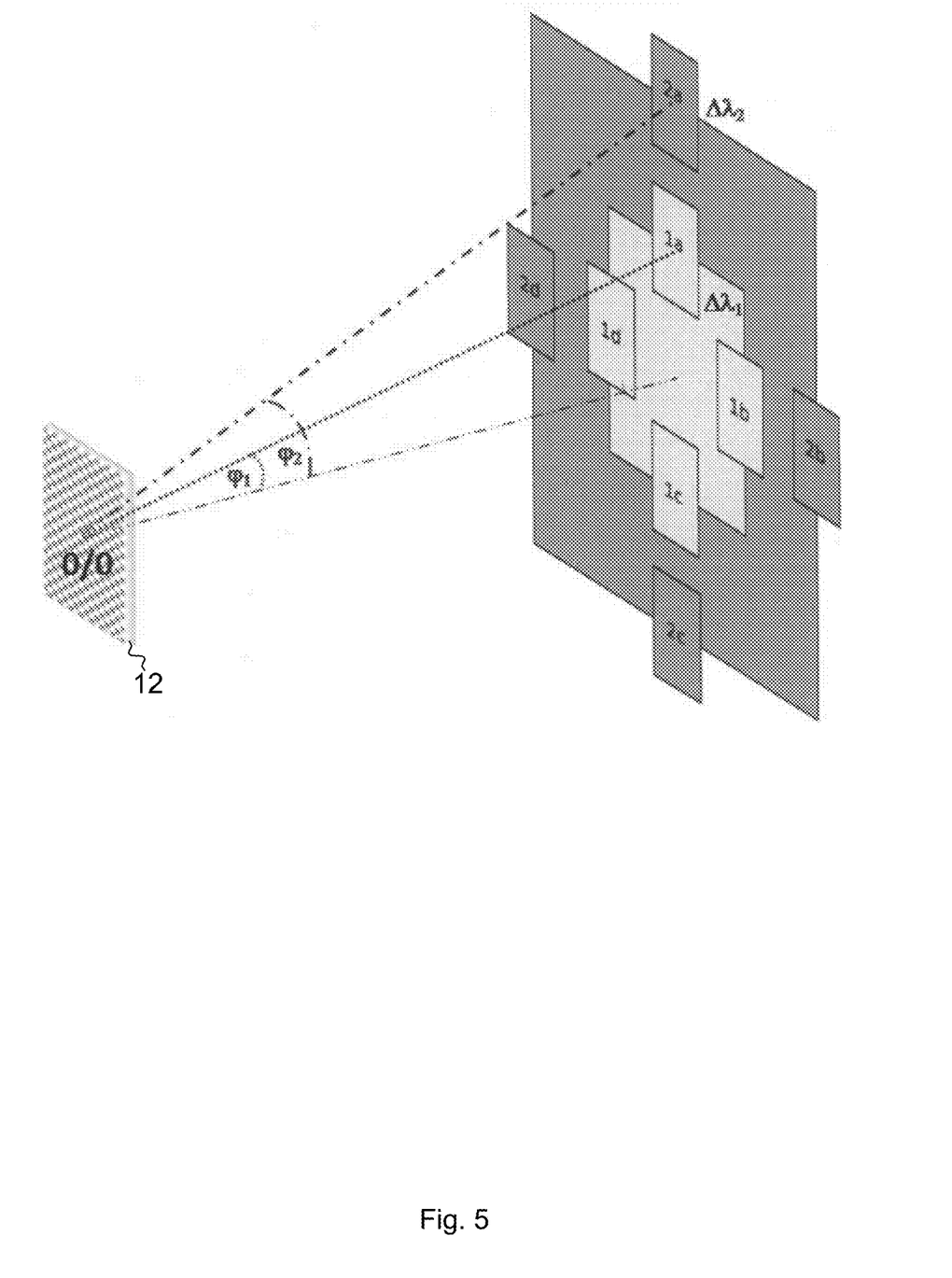
FIG. 5 shows a schematic beam splitting in an embodiment.

FIG. 5 should clarify this context in more detail. FIG. 5 shows a schematic beam splitting in an embodiment comprising a DOE 12 (located in position "0") onto four filter elements (1a, 1b, 1c, 1d) from a first wavelength range $\Delta\lambda_1$ at the angle $\varphi_1$ and independently onto four other filter elements (2a, 2b, 2c, 2d) from a second wavelength range $\Delta\lambda_2$ at the angle of $\varphi_2$, whereby $\Delta\lambda_2 > \Delta\lambda_1$.

This characteristic of the DOE 12 may offer the advantage that beam splitting into a first group of sub-beams 1 may take place without this affecting the overall intensity of the group of sub-beams 2. This allows for effective and economical beam splitting, which exploits the spectral composition of the incident radiation and splits the sub-beams in a wavelength-adjusted manned to the measurement channels from different wavelength ranges using only one beam splitter DOE.

The use of DOE 12a in embodiments may enable an inexpensive and compact optical set-up. DOEs may be molded in large numbers and at low cost, for example, in suitable materials by means of equally known replication techniques. In embodiments, the beam splitter and mixer optics 12 may also comprise optics (lens, collimator, concentrator) which may be arranged either in front of or behind or in each case in front of and behind the diffractive element. In FIG. 4, this is indicated by the element 12b. The beam splitter and mixer optics 12 may comprise at least one collimating or focusing element 12b. The at least one collimating or focusing element 12b may be coupled to the diffractive element. For example, the collimating or focusing element 12b may be a refractive or diffractive element which may also be coupled directly to the diffractive element.

For example, a refractive lens 12a may be arranged in front of, behind or in front of and behind the diffractive element 12a. Preferably, this lens may be arranged on a surface of the base substrate opposite the diffractive element. However, it is also possible to directly integrate the focusing or collimating function as an additional function in the beam-mixing and splitting DOE/CGH or to integrate the same as a separate DOE/CGH on the side opposite the beam splitter/mixer DOE.

Figure 6:
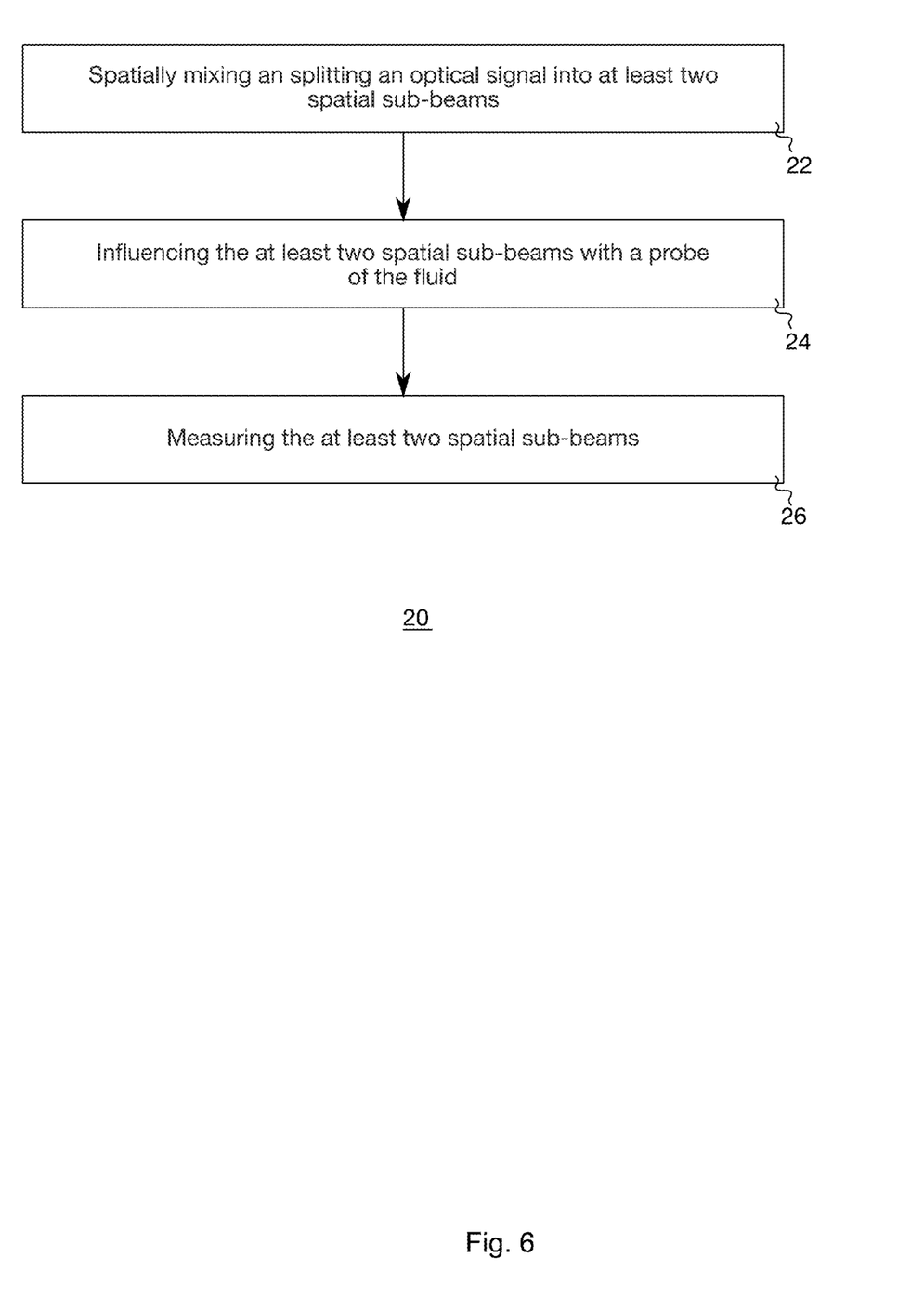
FIG. 6 illustrates a block diagram of an embodiment of a method for analyzing a fluid.

FIG. 6 illustrates a block diagram of an embodiment of a method 20 for analyzing a fluid. The method comprises spatially mixing and splitting 22 an optical signal into at least two spatial sub-beams 15a, 15b. The method 20 further comprises influencing 24 the at least two spatial sub-beams 15a, 15b with a probe of the fluid and measuring 26 the at least two spatial sub-beams 15a, 15b.

The features disclosed in the above description, the claims and the Figures may both individually or in any combination be of importance for the realization of embodiments in their different forms and may, unless explicitly or implicitly stated otherwise in the description, be combined with one another in any way.

Although some aspects have been described in connection with a method and/or an apparatus, it is understood that these aspects also illustrate a description of the corresponding apparatus and/or the corresponding method, so that a block or a device of an apparatus shall also be understood to be a corresponding method step or a feature of a method step, or vice versa. In line with that, aspects described in connection with a, or as a, method step also represent a description of a corresponding block or detail or feature of a corresponding apparatus.

The above described embodiments merely illustrate the principles of the present invention. It is understood that modifications and variations of the arrangements and the details described herein are clear to others skilled in the art. It is the intent, therefore, that this invention be limited only by the scope of the following patent claims and not by the specific details presented by way of the description and explanation of the embodiments herein.

What is claimed is:

1. An arrangement for analyzing a fluid, comprising:
a flow cell configured to spectrally influence an optical signal by means of a probe of the fluid;
beam splitter and mixer optics configured to spatially mix the optical signal and split the same into at least two spatial sub-beams,
wherein a spatial sub-beam comprises a portion of the optical signal that passes through essentially the entire probe; and
a measurement system configured to measure the at least two spatially separated sub-beams,
wherein the beam splitter and mixer optics comprise a diffractive optical element, and
wherein the diffractive optical element is configured to perform a beam splitting of 1 to n into n sub-beams for n measurement fields, wherein n is a non-negative integer greater than 1.

2. The arrangement of claim 1, wherein the beam splitter and mixer optics are arranged in a direction of propagation of the optical signal in front of the flow cell in order to direct the at least two spatial sub-beams through the probe of the fluid.

3. The arrangement of claim 1, wherein the beam splitter and mixer optics are arranged in a direction of propagation of the optical signal behind the flow cell in order to direct the optical signal influenced by the probe of the fluid.

4. The arrangement of claim 1 configured to analyze a gaseous or vaporous fluid.

5. The arrangement of claim 1 comprising at least one light source configured to generate the optical signal for directing the same through the flow cell.

6. The arrangement of claim 1, wherein the measurement system comprises a light receiving unit having at least two light receivers each comprising an upstream and associated filter.

7. The arrangement of claim 1, wherein the diffractive optical element is configured to, as a 1 to n beam splitter, perform a split into at least 4 quadrants.

8. The arrangement of claim 1, wherein the beam splitter and mixer optics are configured to generate a central beam usable as a reference for other beams.

9. The arrangement of claim 1, wherein the beam splitter and mixer optics comprise at least one collimating or focusing element.

10. The arrangement of claim 9, wherein the at least one collimating or focusing element is coupled to the diffractive element.

11. The arrangement of claim 10, wherein the collimating or focusing element is a refractive element arranged in a direction of propagation of the optical signal behind the diffractive element.

12. The arrangement of claim 1, wherein the beam splitter and mixer optics comprise a computer-generated hologram.

13. The arrangement of claim 12, wherein the computer-generated hologram is configured to generate the at least two spatial sub-beams with different intensities.

14. The arrangement of claim 1, comprising a thermal beam emitter as a light source, and wherein the light source comprises collimating optics.

15. The arrangement of claim 14, wherein the collimating optics comprise a reflecting concentrator arranged around the light source.

16. The arrangement of claim 1, wherein the measurement system comprises an optical component in front of a receiver unit, wherein the optical component includes focusing or collimating optics.

17. The arrangement of claim 16, wherein the optical component is a lens configured as:
a refractive lens;
a diffractive lens; or
a Fresnel zone lens; and
wherein the lens comprises a silicon or an IR transparent polymer material.

18. The arrangement of claim 1, wherein the measurement system comprises one or several wavelength-selective filter elements and wherein one filter element each is arranged in front of a receiver element of a light receiver unit.

19. The arrangement of claim 18, wherein filter and receiver elements are arranged in two or more wavelength groups spatially separated from one another.

20. A method for analyzing a fluid, comprising:
spatially mixing and splitting an optical signal into at least two spatial sub-beams using a diffractive optical element;
influencing the at least two spatial sub-beams with a probe of the fluid,
wherein a spatial sub-beam passes through essentially the entire probe; and
measuring the at least two spatial sub-beams,
wherein the diffractive optical element is configured to perform a beam splitting of 1 to n into n sub-beams for n measurement fields,
wherein n is a non-negative integer greater than 1.

* * * * *